United States Patent Office 3,598,783
Patented Aug. 10, 1971

3,598,783
POLYSILOXANE AMIDES
Fred F. Holub, Schenectady, and Denis R. Pauzé, Scotia, N.Y., assignors to General Electric Company
No Drawing. Filed Mar. 11, 1970, Ser. No. 18,688
Int. Cl. C08f 11/04
U.S. Cl. 260—46.5E                    9 Claims

ABSTRACT OF THE DISCLOSURE

Polysiloxane amides are obtained from the reaction of an organic diamine, a phthaloyl halide selected from the class consisting of terephthaloyl and isophthaloyl halides, and a polysiloxane containing terminal silicon-bonded

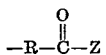

groups where R is a divalent hydrocarbon radical and Z is a halogen, or hydroxyl radical or the —OCH$_3$ radical. Heat-resistant compositions obtained from such polysiloxane amides can be used for insulation and protective purposes where resistance to heat and corona are important requirements.

---

This invention is concerned with polysiloxane amides. More particularly, the invention is concerned with a polymeric composition composed of recurring structural units of the formula (a)

I 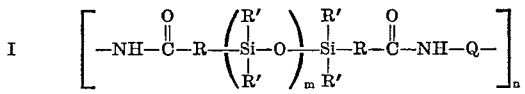

and (b)

II 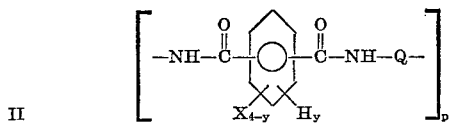

where R is a divalent hydrocarbon radical, R' is a monovalent organic radical, preferably, but not exclusively, selected from the class consisting of monovalent hydrocarbon radicals and halogenated monovalent hydrocarbon radicals, Q is a divalent organic radical, X is halogen (e.g., chlorine, bromine, etc.), m is a whole number equal to at least 1, for example, 1 to 100, n and p are the same or different whole numbers greater than one, for instance, up to 10,000 and more, and y is a whole number equal to from 1 to 4.

The above polysiloxane amides can be prepared by effecting reaction of a mixture of ingredients comprising a polysiloxane of the general formula III 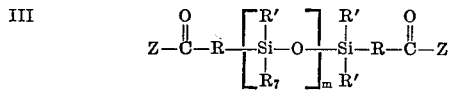

a diamino compound of the formula

IV         H$_2$N—Q—NH$_2$ and a diacyl compound of formula

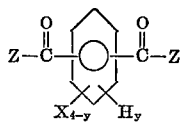

where R, R', X, Q, m and y have the meanings given above, and Z is a member selected from the class consisting of halogen (e.g., chlorine, bromine, fluorine, etc.) the hydroxyl radical, and the —OCH$_3$ radical.

The polymeric compositions described in this invention can be used in electrical insulation, as protective surface coatings and in the formation of heat-resistant films. Solutions or other forms of these polyamide resins can be used to coat electrical conductors such as copper, aluminum, alloys of copper and aluminum, etc. Such solutions can also be used to cast films which can be then used as slot liners for motors, as heat-resistant films for packaging, etc. Additionally, the polymeric compositions herein described have great affinity for various metallic surfaces, and thus can be used as structural adhesives; they also can be formed into fibers or other molded products. In conjunction with other natural and synthetic resins such as phenol-aldehyde resins, polyesters, other polyamides, polyimides, etc., they find many uses for upgrading these latter resins, particularly as to their corona resistance. The polyamide resins can be employed as overcoatings and undercoatings to other resins such as polyvinyl formal resins, polyesters, and the like. Because of the outstanding properties which these materials have and particularly their ease of application, stability, storage capabilities, heat and corona resistance, and excellent adhesion, many other applications will obviously be apparent.

Generally, these polysiloxane amide resins can be prepared by forming a mixture of ingredients comprising a phthaloyl compound (or mixtures of such phthaloyl compounds) of Formula V, a diamino compound (or mixtures of such compounds) of Formula IV and a polysiloxane compound (or mixtures of such compounds) of Formula III. It should be noted that the phthaloyl compound of Formula V is restricted to isophthaloyl and terephthaloyl compounds. When mixtures of these phthaloyl compounds are used, the isophthaloyl compound preferably comprises from 5 to 99 mol percent of the total molar concentration of these reactants. The incorporation of aliphatic diacyl halides, e.g., adipoyl chloride, azelaoyl chloride, succinoyl chloride, etc. with the phthaloyl compound in amounts advantageously up to 10 to 95 mol percent of the total molar concentration of the acyl compounds, is not precluded.

In general, the polysiloxane amide is prepared by mixing and stirring at least one organic diamino compound of Formula IV with a reactable polysiloxane of Formula III and a phthaloyl compound of Formula V, advantageously in an organic liquid which is a solvent for at least one reactant, said solvent being inert to the reactants. Preferably the reaction is conducted under anhydrous conditions for a time of the order of at least one minute at temperatures below 175° C. sufficient to provide a solution containing at least 10% solids of the corresponding polysiloxane amide. In determining a specific time and a specific temperature for forming the aforesaid polysiloxane amide, several factors should be considered. The maximum permissible temperature will depend upon the particular diamine used in combination therewith, the particular polysiloxane compound, and the particular phthaloyl compound, the particular solvent, the percent solids of polysiloxane amide resin which is desired in the final solution, and the minimum period of time one desires for reaction. Generally, temperatures below 100° C. are adequate for the purpose. Since usually the temperature of reaction tends to be exothermic, it may only be necessary to mix the ingredients and therefore permit the temperature to rise to the exotherm temperature and by further adjusting the temperature with or without the intentional addition of heat, reaction can be completed in the matter of from about 5 minutes to 30 minutes or more up to the time required to give complete reaction to form the desired polysiloxane amide. After forming the polysiloxane amide solution, any unreacted materials can be removed and the solution used as such for coating purposes, film formation, etc. Alternatively, the polysiloxane amide may also be treated to remove solvent and used as a shapeable (i.e., moldable) material.

In general, the process for making the polyamide involves reacting approximately a molar amount of the organic diamine of Formula IV which equals the total molar concentrations of the polysiloxane of Formula III and the phthaloyl compound of Formula V, in an organic solvent with agitation. Dissolving the reactants in separate solvents and thereafter mixing the solutions may also be employed. Since the reaction tends to be exothermic and to accelerate quite rapidly, it is important in many instances to regulate the additions and the temperature to maintain the reaction temperature below a predetermined value. In all instances, agitation of the reactants is advantageously employed while at the same time maintaining anhydrous conditions. The molar concentration can be varied within certain limits; generally one can employ about 1 mol of the diamino compound per mol of the total molar concentration of the phthaloyl compound and polysiloxane compound of Formula III combined in order to obtain a high molecular weight product. However, the use of an excess of up to 5 mol percent of the reactants combined on the above bases is not precluded. Greater molar excesses may result in reduction in the molecular weight.

The molar relationship of the phthaloyl compound and the polysiloxane can be varied widely. Greater heat resistance and stability results if the phthaloyl compound predominates. However, one can employ, on a molar basis, from 0.1 to 10 mols or more of the phthaloyl compound per mol of the polysiloxane of Formula III.

The polysiloxane amide thus formed can be characterized by its degree of molecular weight and solubility by means of its intrinsic viscosity when measured at 30° C., at a concentration of 0.5 percent, by weight, of the polymer in a solvent such as N-methyl-2-pyrrolidone. The intrinsic viscosity of the polysiloxane amide should be at least 0.1, and preferably in the neighborhood of about 0.2 to 4 or 5.

The quantity of organic solvent used in the present invention need be only that sufficient to dissolve enough of the reactants to form a medium for initiation of the reaction between the organic diamine, the phthaloyl compound, and the polysiloxane. Generally, the solvent comprises from 10 to 90% of the total weight of all the ingredients.

In the organic diamine of the formula $$H_2N\text{—}Q\text{—}NH_2$$

Q may be any one of the following divalent organic groups: aromatic, aliphatic, cycloalphatic, a combination of aromatic and aliphatic, heterocyclic, bridged organic radicals wherein the bridge is hydrocarbon (e.g., methylene, isopropylidene, etc.), oxygen, nitrogen, sulfur, silicon or phosphorus, or substituted groups thereof. More generally, the diamines used with the cyclic sulfone diamines are primary diamines. Among the diamines which are suitable for use in the present invention are meta-phenylene diamine; para-phenylene diamine; 4,4-diamino-diphenyl propane; 4,4'-diamino-diphenyl methane; benzidine; 4,4'-diamino-diphenyl sulfide; 3,3'-diamino-diphenyl sulfone; 4,4'-diamino-diphenyl sulfone; benzidine cyclic sulfone; 4,4'-methylene-3,3'-sulfonyl dianiline; 4,4' - diamino-diphenyl ether; 2,6-diamino pyridine; bis-(4-aminophenyl) diethyl silane; bis-(4-amino-phenyl) phosphine oxide; bis(4-aminophenyl)-N-methylamine; 1,5-diamino-naphthalene; 3,3'-dimethyl-4,4'-diamino-biphenyl; 3,3'-dimethoxy benzidine; 2,4-bis-(beta-amino-t-butyl - phenyl) ether; para-bis-(2-methyl-4-amino-pentyl) benzene; para-bis-(1,1-dimethyl-5-amino-pentyl) benzene; m-xylylene diamine; p-xylylene diamine; bis(para-amino-cyclohexyl) methane; hexamethylene diamine; heptamethylene diamine; octamethylene diamine; nonamethylene diamine; decamethylene diamine; 3-methylheptamethylene diamine; 4,4 - dimethylheptamethylene diamine; 2,11 - diamino-dodecane; 1,2,-bis-(3-amino-propoxy) ethane; 2,2-dimethyl propylene diamine; 3-methoxy-hexamethylene diamine; 2,5-dimethyl-hexamethylene diamine; 2,5-dimethylheptamethylene diamine; 5-methylnonamethylene diamine; 1,4-diamino-cyclohexane; 1,12-diamino-octadecane;

$$H_2N(CH_2)_3O(CH_2)_2O(CH_2)_3NH_2$$

$$H_2N(CH_2)_3S(CH_2)_3NH_2$$

$H_2N(CH_2)_3N(CH_3)(CH_2)_3NH_2$; and mixtures thereof.

Among the phthaloyl compounds of Formula V which may be employed in the practice of the present invention are, for instance, isophthaloyl chloride, terephthaloyl chloride, dimethyl isophthalate, dimethyl terephthalate, isophthalic acid, terephthalic acid, chloroisophthaloyl chloride, dichloroterephthaloyl chloride, etc.

Any suitable solvent may be employed in making the polyamide acids. The solvent should be inert to the system and should be a solvent for the reaction product, and certainly must be a solvent for at least one of the reactants and preferably for all of the reactants. Additionally, the solvent should be one which can be readily removed by volatilization and by application of reasonable amounts of heat. Among such solvents which may be used are N,N-diethylformamide, N,N-diethylacetamide, N,N-dimethylmethoxy acetamide, N-methyl caprolactam, etc. Other solvents which may be used in the present invention are: N-methyl - 2 - pyrrolidone, tetramethylene urea, pyridine, hexamethylphosphoramide, formamide, N-methyl-formamide, and N-acetyl - 2 - pyrrolidone. The solvents can be used alone, in combinations of solvents, or in combination with poor solvents such as benzene, benzonitrile, dioxane, butyrolactone, xylene, toluene and cyclohexane.

Among the monovalent organic radicals, for example, hydrocarbon radicals, which R' may be are, for instance, alkyl radicals (e.g., methyl, ethyl, propyl, butyl, isobutyl, decyl, etc.); aryl radicals (e.g., phenyl, naphthyl, biphenyl, etc.); alkaryl radicals (e.g., tolyl, xylyl, ethylphenyl, etc.); aralkyl radicals (e.g., benzyl, phenylethyl, etc.); alkenyl radicals (e.g., vinyl, allyl, methallyl, etc.), cyanoalkyl radicals (e.g., cyanomethyl, cyanoethyl, cyanopropyl, etc.); halogenated hydrocarbon radicals (e.g., dichlorophenyl, bromophenyl, etc.) etc.

Among the divalent hydrocarbon divalent organic radicals which R may represent are, for instance, ethylene, trimethylene, isopropylidene $$[\text{—}(CH_3)C(CH_3)\text{—}]$$

isobutylene, tetramethylene, pentamethylene, phenylene, tolylene, xylylene, biphenylene

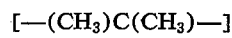

diphenylene methane ($\text{—}C_6H_4\text{—}CH_2\text{—}C_6H_4\text{—}$), diphenylene oxide

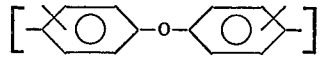

diphenylene sulfone, etc., with valences of the arylene radicals being ortho, meta, or para to each other or to connecting bonds between adjacent arylene radicals. R is preferably a divalent aliphatic hydrocarbon radical of from 2 to 6 carbon atoms.

Among the polysiloxanes corresponding to Formula III which may be employed in the practice of the present invention may be mentioned 1,3 - bis($\gamma$-carboxypropyl)-1,1,3,3 - tetramethyldisiloxane; 1,3 - bis($\gamma$-chloroformyl-propyl)-1,1,3,3-tetramethyldisiloxane; polysiloxanes having the following formulas:

VI
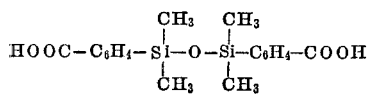

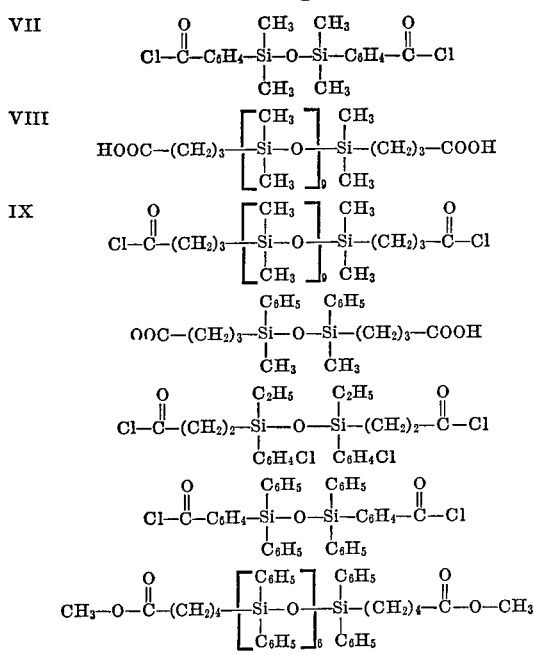

etc.

More broadly these polysiloxanes have the generic formula

X $$(Z-\overset{O}{\overset{\|}{C}}-C_qH_{2q})_a(R')_b Si-O_{\frac{4-a-b}{2}}$$

where $a = 0.001$ to $0.1$, $q$ is at least 2 or more, e.g., 2 or 3, $a+b = 1.999$ to $2.001$, and Z and R' have the meanings above.

The compositions embraced by Formula III can be prepared by methods well known in the art. For instance, the carboxy derivatives can be prepared by the hydrolysis of the cyanoalkyl polysiloxanes as shown in U.S. Pat. 2,900,363, issued Aug. 18, 1959. The acyl halides encompassed by Formula III can be obtained from the carboxy derivative by treatment with a thionyl halide; other means for preparing such polysiloxanes whether carboxy derivatives or the acyl halide derivatives thereof, and further examples of such compositions may be found disclosed in U.S. Pats. 2,589,446, issued Mar. 18, 1952; U.S. 3,047,528 and 3,047,499, both issued July 31, 1962; U.S. 3,143,524, issued Aug. 4, 1964; U.S. 2,601,237, issued June 24, 1952; French Pat. 1,158,808, etc. By reference these patents are all made part of the disclosures and teachings of the instant application as basis for the various polysiloxanes of Formula III which can be employed as well as a basis for the means for preparing such polysiloxanes.

In order that those skilled in the art may better understand how the present invention may be practiced, the following examples are given by way of illustration and not by way of limitation. In the following examples all reactions were conducted in an inert atmosphere, namely, under nitrogen, and under anhydrous conditions.

To establish certain properties, the cut-through temperatures of some of the samples were determined. This cut-through temperature is the temperature at which the enamel wire separating two magnet wires crossed at 90° and supporting a given load on the upper wire flows sufficiently to establish electrical contact between two conductors. Since magnet wires in electrical apparatus may be under compression, it is important that the wires be resistant to softening by high temperatures so as to prevent short circuits within the apparatus. The tests are conducted by placing two eight inch lengths of enameled wire perpendicular to each other under a load of 1000 grams at the intersection of the two wires. A potential of 110 volts A.C. is applied to the end of each wire and a circuit which contains a suitable indicator such as a buzzer or neon lamp is established between the ends of the wires. The temperature of the crossed wires and the load is then increased at the rate of 3 degrees per minute until the enamel softens sufficiently so that the bare conductors come into contact with each other and cause the neon lamp or buzzer to operate. The temperature at which this circuit is established is measured by a thermocouple extending into a thermowell to a point directly under the crossed wires. The cut-through temperature is taken as the temperature in the thermowell at the moment when the current first flows through the crossed wires.

EXAMPLE 1

A reaction vessel was charged with 37.04 grams N-methyl-2-pyrrolidone and 3.96 grams (0.02 mol) p,p'-methylene dianiline. To the stirred solution were added 2.03 grams (0.01 mol) isophthaloyl chloride and 3.43 grams (0.01 mol) of 1,3-bis(γ-chloroformylpropyl)-1,1,3,3-tetramethyldisiloxane. The reaction temperature rose due to the exothermic reaction rapidly to about 64° C. After further stirring for 2 hours at room temperature, the polymer-containing solution was precipitated by the slow addition into a blender containing water. The precipitate was filtered, washed twice with water, and dried in vacuum for about 18 hours at 100° C. This polymer was composed of recurring structural units of the formula

XI

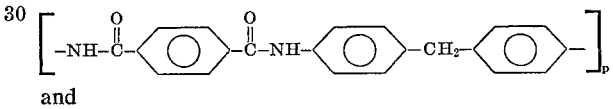

and

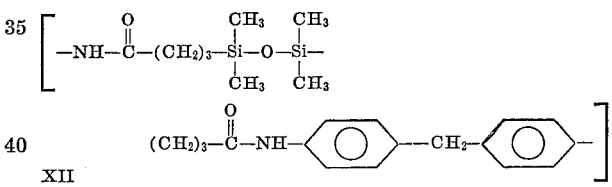

XII where $n$ and $p$ are whole numbers greater than 1. A solution of the above polymer containing 20% solids in N-methyl-2-pyrrolidone was prepared and the film was cast on an aluminum substrate which was previously treated with a dilute solution of trichlorobiphenyl. The film was heated at 100° C. for one hour, at 150° C. for one hour, at 200° C. for one hour and 250° C. for one hour to give a clear, flexible, strong film which had good heat resistance and also had good electrical characteristics.

EXAMPLE 2

To a reaction vessel were charged 68.64 grams of N-methyl-2-pyrrolidone and 7.92 grams (0.04 mol) p,p'-methylene dianiline. The contents were stirred under nitrogen and to this were added 6.48 grams (0.0328 mol) isophthaloyl chloride and 2.76 grams (0.008 mol) bis(γ-chloroformylpropyl)-1,1,3,3 - tetramethyldisiloxane. With further mixing the temperature rose to about 66° C. After a total stirring of about 2 hours, the contents of the reaction vessel were added to a mechanical blender containing water and the resulting precipitate which was obtained was filtered and washed twice with water and then dried in vacuum at 105° C. for about 18 hours to give a white powder. This polymer was composed of the same recurring structural units of Formulas XI and XII as in Example 1 with the exception that the molar concentrations of the units was different corresponding to the molar concentrations of the starting ingredients. This polymer was dissolved in N-methyl pyrrolidone to form a 25% solids solution and cast as a film on an aluminum substrate and thereafter heated at 100° C. for 1 hour, 150° C. for 1 hour, 200° C. for 1 hour, and 250° C. for 10 minutes to give a clear, flexible film which had a cut-through temperature of 250° C.

EXAMPLE 3

A polysiloxane amide was prepared similarly as in Example 2 from 4.04 grams (0.02 mol) isophthaloyl chloride, 7.92 grams (0.04 mol) p,p'-methylene dianiline, 6.86 grams (0.02 mol) bis(γ-chloroformylpropyl)-1,1,3,3-tetramethyl disiloxane and 75.2 grams N-methyl-2-pyrrolidone. After working up the polymer in the same way as was done in Example 2, the isolated polymer was formed into a 25% solids solution in N-methyl-2-pyrrolidone and deposited on an aluminum substrate and heated using the same heat cycle as in Example 2 to give a clear, flexible film which had a cut-through temperature of 240° C.

EXAMPLE 4

A polyamide siloxane was prepared similarly as in Example 2 from 8.12 grams (0.04 mol) isophthaloyl chloride, 2.03 grams (0.01 mol) terephthaloyl chloride, 11.88 grams (0.06 mol) p,p'-methylene dianiline, 3.43 grams (0.01 mol) bis-(γ chloroformyl propyl)1,1,3,3-tetramethyldisiloxane, and 101.84 grams N,N'-dimethylacetamide. The reaction was carried out similarly as in Example 2 and then the polymer was isolated, formed into a 25% solids solution in N,N'-dimethyl acetamide and then heated similarly as was done in Example 2 to give a flexible film which had a cut-through temperature of 325° C.

EXAMPLE 5

Employing the same conditions as in Example 2, a polysiloxane amide was prepared from 4.06 grams (0.02 mol) isophthaloyl chloride, 1.62 grams (0.015 mol) m-phenylene diamine, 1.71 grams (0.005 mol) bis(γ-chloroformylpropyl)-1,1,3,3-tetramethyl disiloxane, and 29.6 grams of N-methyl-2-pyrrolidone. The reaction was carried out similarly as was done in Example 2 and the polymer was isolated and formed into a 25% solids solution in N-methyl-2-pyrrolidone, again in the same manner as in Example 2, to give a flexible film which had a cut-through temperature of 200° C. This polymer was composed of recurring structural units of the formulas

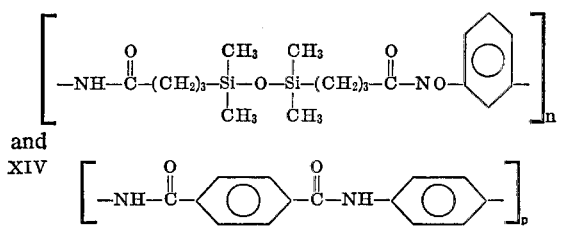

and
XIV

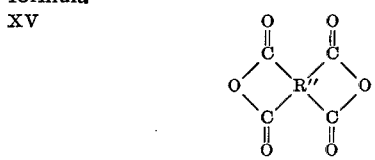

where $n$ and $p$ are whole numbers in excess of 1.

In addition to making polymers of the kind described above, it is also possible to incorporate in the procedural steps for making the polymer a dianhydride of the formula
XV where R″ is an organic tetravalent radical preferably containing at least one ring of six carbon atoms, said ring being characterized by benzenoid unsaturation, the four carbonyl groups being attached directly to separate carbons in a ring, each pair of carbonyl groups being attached to adjacent carbon atoms in a ring of the R″ radical. Among the tetracarboxylic dianhydrides which may be employed in the present invention are the many which are described in U.S. 3,179,614 which by reference is made part of the disclosure of the instant application and include, for instance, pyromellitic dianhydride; 2,3,6,7-naphthalene tetracarboxylic dianhydride; 3,3',4,4'-diphenyl tetracarboxylic dianhydride; 1,2,3,4 - cyclopentane tetracarboxylic dianhydride; 2,2',3,3' - diphenyl tetracarboxylic dianhydride; 2,2 - bis(3,4 - dicarboxyphenyl) propane dianhydride; 3,4-dicarboxyphenyl sulfone dianhydride; 2,3,4,5 - pyrrolidine tetracarboxylic dianhydride; 3,4,9,10-perylene tetracarboxylic dianhydride; bis(3,4-dicarboxyphenyl) ether dianhydride, 3,3',4,4' - benzophenone tetracarboxylic acid dianhydride (hereinafter referred to as "BPDA"); ethylene glycol bis-trimellitate dianhydrides, a dianhydride of the formula

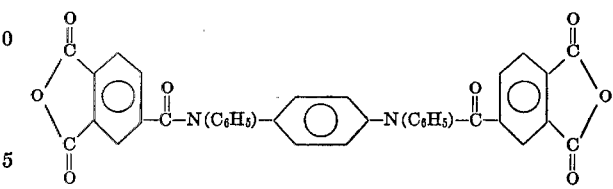

etc.

Illustrative of the incorporation of the above tetracarboxylic dianhydride is the following example:

Employing N-methyl-2-pyrrolidone as a solvent, p,p'-methylene dianiline, isophthaloyl chloride, 1,3 - bis(γ-chloroformylpropyl) - 1,1,3,3 - tetramethyldisiloxane, and BPDA were mixed together in a molar ratio of 3:1:1:1 and heated similarly as was done in Example 1 to obtain a polymeric solution which could be cast on a substrate and heat-cured as in Example 1 to obtain a clear, flexible, heat-resistant film. In addition to containing the recurring units of those found in Example 1, this polymer also contained recurring structural units of the formula
XVI

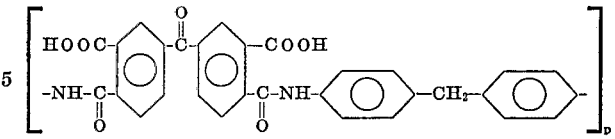

which made the initial polymer a polyamide acid. By heat curing this material, as described above, the polyamide acid portion as identified by the recurring unit XVI was converted to a polyimide recurring structure of the formula
XVII

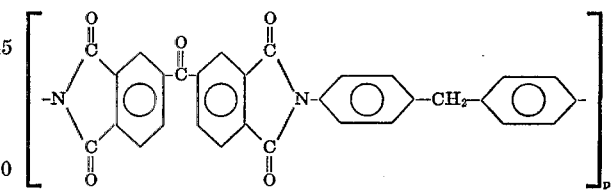

where $p$ has the meaning given above.

It will of course be apparent to those skilled in the art that in addition to the diamino compound, phthaloyl compound, and polysiloxane compound (including polysiloxane compounds containing terminal —COOH or terminal —OCH₃ groups) employed in the foregoing examples, other members of these classes may be used in the examples which have been recited previously without departing from the scope of the invention. Additional dianhydrides or mixtures of any of the foregoing ingredients can be employed to give new and useful products which in turn can be converted to strong, flexible, films, fibers, coatings, filled molded products, etc.

What we claim as new and desire to secure by Letters Patent of the United States is:

1. Polysiloxane amide compositions having an intrinsic viscosity of at least 0.1 when measured at 30° C. at a concentration of 0.5 percent by weight, of said polysiloxane amide in N-methyl-2-pyrrolidone, composed of recurring structural units of the general formulas

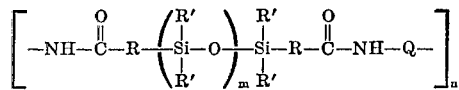

and

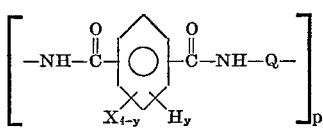

where R is a divalent hydrocarbon radical, R' is a monovalent organic radical selected from the class consisting of monovalent hydrocarbon, monovalent halogenated hydrocarbon and cyanoalkyl radicals, Q is a divalent organic radical, X is halogen, $m$ is a whole number equal to from 1 to 100, $n$ and $p$ are whole numbers greater than 1, and $y$ is a whole number from 1 to 4.

2. A polymeric composition as in claim 1 composed of recurring structural units of the formulas

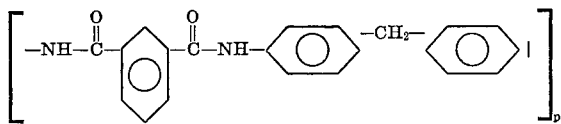

and

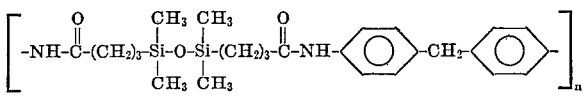

where $n$ and $p$ are whole numbers greater than 1.

3. A polymeric composition as in claim 1 composed of recurring structural units of the formulas

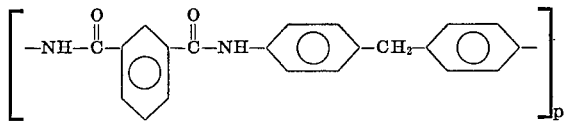

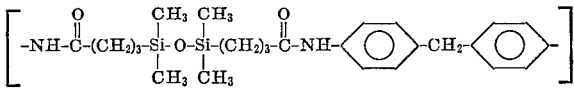

and

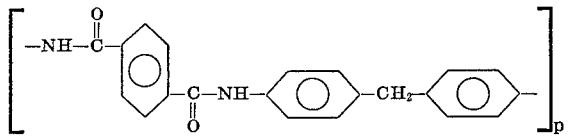

where $n$ and $p$ are whole numbers greater than 1.

4. A polymeric composition as in claim 1 composed of recurring structural units of the formulas

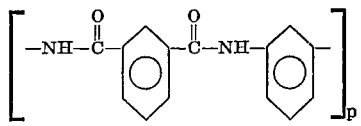

and

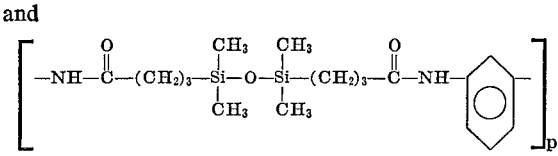

where $n$ and $p$ are whole numbers greater than 1.

5. The process for making polysiloxane amide compositions of claim 1 which comprises (1) forming a mixture of ingredients in an inert organic solvent comprising (a) a polysiloxane of the general formula

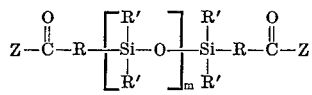

a (b) diamino compound of the general formula $$H_2N—Q—NH_2$$

and (a) a phthaloyl compound of the general formula

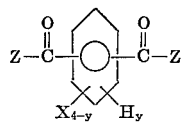

where R is a divalent hydrocarbon radical, R' is a monovalent organic radical selected from the class consisting of monovalent hydrocarbon, monovalent halogenated hydrocarbon and cyanolakyl radicals, Q is a divalent organic radical, Z is a member selected from the class consisting of halogen, the hydroxyl radical and the —OCH$_3$ radical, X is a halogen, $m$ is a whole number equal to from 1 to 100, $n$ and $p$ are whole numbers greater than 1, and $y$ is a whole number from 1 to 4 and (2) reacting said mixture of ingredients at a temperature and time sufficient to form a solution containing at least 10% solids of said polysiloxane amide.

6. The process as in claim 5 wherein the diamino compound is p,p'-methylene dianiline.

7. The process as in claim 5 wherein the phthaloyl compound is isophthaloyl chloride.

8. The process as in claim 5 wherein the phthaloyl compound is terephthaloyl chloride.

9. The process as in claim 5 wherein the polysiloxane is 1,3-bis(γ-chloroformyl propyl) - 1,1,3,3 - tetramethyl disiloxane.

References Cited

UNITED STATES PATENTS 3,392,143   7/1968   Holub _____ 260—46.5

DONALD E. CZAJA, Primary Examiner

M. I. MARQUIS, Assistant Examiner

U.S. Cl. X.R.

117—135.1R, 138.8F; 252—63.7R; 260—30.2R, 30.4SB, 32.6N, 33.6SB, 46.5G, 78R, 824R, 826R